United States Patent
Prasannavenkatesan et al.

(10) Patent No.: US 11,463,167 B1
(45) Date of Patent: Oct. 4, 2022

(54) IR TRANSMISSIVE VISIBLE-LIGHT BARRIERS AND DEVICES INCLUDING THE SAME

(71) Applicant: Facebook Technologies, LLC, Menlo Park, CA (US)

(72) Inventors: Rajesh Prasannavenkatesan, Menlo Park, CA (US); Luke Murphy, North Bend, WA (US); Elizabeth Tu, Seattle, WA (US); Peter Wesley Bristol, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 223 days.

(21) Appl. No.: 16/716,442

(22) Filed: Dec. 16, 2019

(51) Int. Cl.
| H04B 10/116 | (2013.01) |
| G02B 5/20 | (2006.01) |
| G02B 5/22 | (2006.01) |
| G02B 5/02 | (2006.01) |

(52) U.S. Cl.
CPC ......... *H04B 10/116* (2013.01); *G02B 5/0236* (2013.01); *G02B 5/206* (2013.01); *G02B 5/207* (2013.01); *G02B 5/208* (2013.01); *G02B 5/22* (2013.01)

(58) Field of Classification Search
CPC .......... G02B 5/208; G02B 5/20; G02B 5/206; G02B 5/207; G02B 5/22; G02B 5/02; G02B 5/0205; G02B 5/0236; G02B 5/0242; G02B 5/0294
See application file for complete search history.

(56) References Cited

U.S. PATENT DOCUMENTS

| 2009/0128738 A1 * | 5/2009 | Matsumoto | G02B 5/0278 349/64 |
| 2012/0087105 A1 | 4/2012 | Dai et al. | |
| 2017/0351009 A1 * | 12/2017 | Matsuo | G03B 21/60 |
| 2019/0243039 A1 * | 8/2019 | Takishita | G02B 5/223 |
| 2019/0339432 A1 | 11/2019 | Du et al. | |
| 2021/0080632 A1 * | 3/2021 | Sharma | G02B 5/0236 |

FOREIGN PATENT DOCUMENTS

| EP | 1837920 A1 * | 9/2007 | G02B 5/281 |

OTHER PUBLICATIONS

Harwick Standard, "Tipaque PFC105", http://www.harwick.com/products/2391/tipaquereg-pfc105, available online at least as of Jun. 26, 2019 per the Internet Archive, accessed Sep. 23, 2021 (Year: 2019).*
Dupont Titanium Technologies, "DuPont Ti-Pure Titanium Dioxide: Polymers, Light and the Science of TiO2", 2007, 20 pages.
PCI Paint & Coatings Industry, "TiO2 Basics for Paint Appearance and Performance", URL: https://www.pcimag.com/articles/83622-tio2basics-for-paint-appearance-and-performance, as accessed on Mar. 11, 2020, 10 pages.

* cited by examiner

*Primary Examiner* — Stephone B Allen
*Assistant Examiner* — Adam W Booher
(74) *Attorney, Agent, or Firm* — FisherBroyles, LLP

(57) ABSTRACT

The disclosed visible-light barrier may include a light-scattering layer that preferentially scatters visible light over infrared light. The light-scattering layer may include (1) a substantially transparent or translucent material and (2) at least one of $TiO_2$ or ZnO particles dispersed within the substantially transparent or translucent material at a concentration of from approximately 0.02 wt % to approximately 2 wt %. Various other articles, devices, systems, and methods are also disclosed.

19 Claims, 14 Drawing Sheets

IR TRANSMISSIVE VISIBLE-LIGHT BARRIERS AND DEVICES INCLUDING THE SAME

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
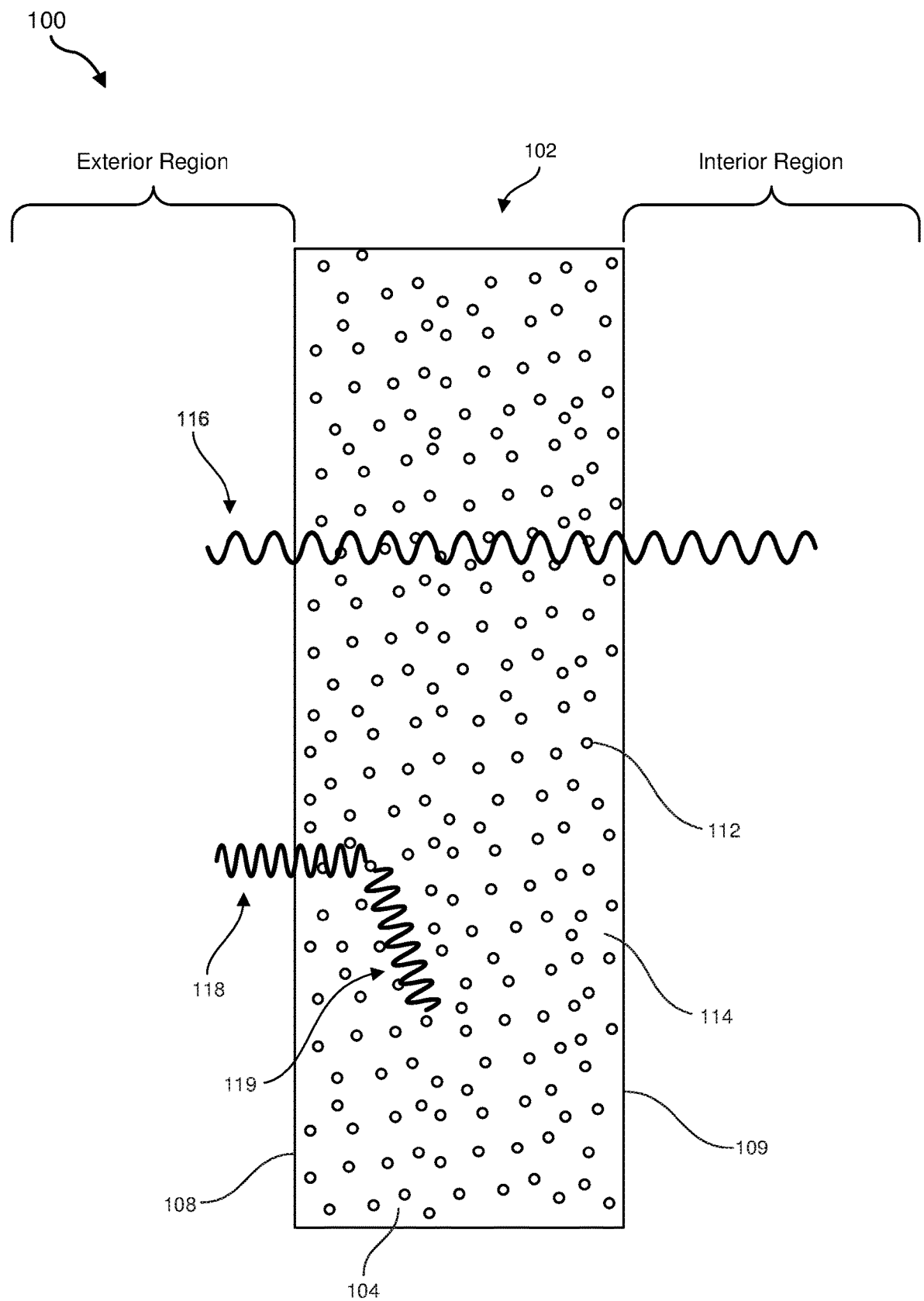
FIG. 1 is an illustration of an exemplary system for selectively transmitting infrared light through a device exterior surface having non-black coloration in accordance with embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Technologies that utilize infrared (IR) light are commonly used in a wide variety of applications. For example, artificial reality devices, including virtual reality, augmented reality, and mixed reality headsets, commonly utilize arrays of IR light-emitting diodes to enable accurate tracking of user position and movements. Specialized IR projectors that produce detectable patterns may also be used to map a user's local environment. Imaging devices (e.g., night-vision goggles, thermographic cameras, etc.) have long exploited environmental IR light emitted from object surfaces to provide detailed views that would otherwise be invisible to the human eye. IR spectrometers, such as Fourier transform IR (FTIR) spectrometers that measure sample responses during exposure to a spectrum of IR beam wavelengths, are commonly utilized for identifying a wide variety of chemical compounds. Electronic devices found in households and organizations, such as remote controls, appliances, and computer peripherals, frequently utilize short-range IR communication transmit signals and data. Longer-range IR communication technologies are also becoming more commonplace due to their ability to transmit large amounts of data at relatively low cost.

Unfortunately, options for customizing the look of IR enclosures, particularly the color, are often limited. Conventionally, enclosures and covers for IR emitters and detectors are formed of dark black-colored polymer materials. The materials are usually pigmented to absorb and filter out visible light while allowing for transmission of a significant portion of incident IR light having a desired wavelength. The black enclosure materials may be aesthetically preferable to transparent clear covers, which can expose internal components to view from the outside. Additionally, transparent covers may not be usable on IR sensor devices due to optical interference from excessive amounts of environmental IR light incident on the exposed IR sensors. Further, transparent covers may not be well-suited for use in housing designs due to mechanical limitations of the materials, which may be prone to scratching or breakage. While certain coloring agents, such as coloring or whitening pigments, may be utilized to produce colored polymers that block light in the visible spectrum, such pigments also tend to block an unacceptable amount of IR light, rendering the devices unsuitable for tracking, communication, data transfer, and other purposes.

The present disclosure is generally directed to visible-light barriers that include light-scattering layers, as well as devices and systems including the visible-light barriers, and corresponding methods. As will be explained in greater detail below, embodiments of the present disclosure may provide additional color options for IR device covers and housings while only minimally impacting effective IR light transmission. Embodiments of the present disclosure may have one or more advantages over conventional IR cover materials. For example, the unique color options obtainable using the disclosed multilayered configurations may provide additional visual appeal and customizability to devices while obscuring internal components from view and preventing optical interference from environmental light. Additionally, the multilayered material configurations may be suitable for use in a variety of housing designs, allowing for simplified device construction while providing consistent and visually-pleasing coloration over a substantial portion of the exterior surface.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-13, detailed descriptions of multilayered articles including light-scattering layers, methods for producing the multilayered articles, and corresponding devices having exterior housings that include the multilayered articles.

FIG. 1 shows an exemplary system 100, such as an IR transmission system for sending or receiving IR light. As shown, system 100 may include a visible-light barrier 102 that includes a light-scattering layer 104. Visible-light barrier 102 may be any suitable barrier member disposed between an interior region of a device and an exterior region surrounding the device. For example, visible-light barrier 102 may be an enclosure, such as a housing or cover, or a portion thereof, or any other suitable blocking layer that filters out at least a portion of light (e.g., visible light) outside a desired wavelength range (e.g., IR spectrum light). While various embodiments disclosed herein describe and show visible-light barrier 102 disposed over IR emitting and/or receiving components, in some examples, visible-light barrier 102 may additionally or alternatively cover portions of a device that do not include such IR components. For example, visible-light barrier 102 may cover a substantial portion of a head-mounted-display device such that portions of visible-light barrier 102 extend over multiple IR emitters (e.g., IR LEDs) and/or IR sensors as well as portions of the display device between and/or surrounding the IR emitter and/or sensor locations.

Light-scattering layer 104 may be disposed between the interior and exterior regions of the device. In some embodiments, light-scattering layer 104 may be positioned adjacent to, abutting, and/or in contact with one or more other portions of a device, such as an IR-transmissive layer (see FIG. 5) and/or a portion of the device supporting and/or coupling light-scattering layer 104 to the device. In at least one example, visible-light barrier 102 may include one or more layers in addition to light-scattering layer 104.

FIG. 1 illustrates how light-scattering layer 104 may affect light passing therethrough. According to some embodiments, light-scattering layer 104 may include $TiO_2$ (titanium dioxide) or ZnO (zinc oxide) particles that are sized to preferentially scatter light having wavelengths in the visible spectrum over light having wavelengths in the infrared spectrum. As shown, for example, in FIG. 1, light-scattering layer 104 may include a plurality of oxide particles 112 (e.g., titanium dioxide and/or zinc oxide) dispersed throughout a light-transmissive material 114. As will be described in greater detail below, the sizes of oxide particles 112 may be selected to preferentially scatter visible light to a greater extent than light having longer wavelengths, such as infrared light. Accordingly, at least a portion of visible light incident on light-scattering layer 104 may be scattered back to the exterior environment from light-scattering layer 104. Such scattered light may give light-scattering layer 104 a non-black appearance to an external viewer. For example, red, green, and blue light may be scattered by oxide particles 112 in substantially the same or similar proportions such that light emitted from light-scattering layer 104 produces a visually gray or off-white appearance.

The concentration of oxide particles 112 within light-scattering layer 104 and/or the thickness of light-scattering layer 104 between exterior surface 108 and an interior surface 109 may be selected such that light-scattering layer 104 scatters a desired proportion of incident visible light while allowing for transmission of a suitable amount of infrared light. For example, light-scattering layer 104 may include oxide particles 112 at a concentration of from approximately 0.02 wt % to approximately 2 wt % (e.g., approximately 0.1 wt %, approximately 0.15 wt %, approximately 0.2 wt %, approximately 0.25 wt %, approximately 0.3 wt %, approximately 0.35 wt %, approximately 0.4 wt %, approximately 0.45 wt %, approximately 0.5 wt %, approximately 0.6 wt %, approximately 0.7 wt %, approximately 0.8 wt %, approximately 0.9 wt %, approximately 1.0 wt %, approximately 1.1 wt %, approximately 1.2 wt %, approximately 1.3 wt %, approximately 1.4 wt %, approximately 1.5 wt %). Additionally or alternatively, light-scattering layer 104 may have a thickness between exterior surface 108 and interior surface 109 of from approximately 1 mm to approximately 5 mm (e.g., approximately 1 mm, approximately 2 mm, approximately 3 mm, approximately 4 mm, approximately 5 mm, or greater).

Light-transmissive material 114 may be a transparent or translucent solid material surrounding the oxide particles. For example, light-transmissive material 114 may be a polymeric material formed from a resin or coating layer. In some examples, light-transmissive material 114 may include one or more polymer materials, such as an acrylate, styrene, polyester, polycarbonate, epoxy, halogenated polymer, silicone, and/or other suitable polymer. In at least one embodiment, light-scattering layer 104 may be produced from a curable mixture, such as a resin composition in which oxide particles 112 are dispersed. In some examples, light-scattering layer 104 may be formed from a thermoplastic polymer material that is molded via, for example, injection molding or any other suitable process.

As shown in FIG. 1, longer-wavelength light 116, such as IR light having a wavelength of approximately 700 nm or more, may have a greater tendency to pass through light-scattering layer 104 without being scattered by oxide particles 112, while shorter-wavelength light 118, such as visible light having wavelengths between approximately 400 nm and approximately 700 nm, may be scattered within light-scattering layer 104 to a greater extent. For example, as illustrated, a photon of longer-wavelength light 116 that is incident on exterior surface 108 may pass through light-scattering layer 104, exiting from interior surface 109. In contrast, a photon of shorter-wavelength light that is incident on exterior surface 108 may be scattered within light-scattering layer 104. For example, a photon of shorter-wavelength light 118 shown in FIG. 2 may proceed along an initial path through light-scattering layer 104 until it encounters an oxide particle 112, such as a $TiO_2$ particle, which redirects the photon along a different path, represented as an exemplary path of scattered light 119. Shorter-wavelength light 118 may be scattered multiple times by oxide particles 112 within light-scattering layer 104, with at least some of the scattered light 119 exiting from exterior surface 108 such that it is visible to external viewers. Additional scattered light 119 may exit from interior surface 109. While FIG. 2 illustrates longer-wavelength light 116 that is transmitted through light-scattering layer 104 and shorter-wavelength light 118 that is scattered within light-scattering layer 104, at least a portion of longer-wavelength light 116 may also be scattered by oxide particles 112 within light-scattering layer 104 and at least a portion of shorter-wavelength light 118 may be transmitted through light-scattering layer 104 without first being scattered.

Light may be scattered within light-scattering layer 104 by oxide particles 112 via, for example, refraction and/or diffraction. In some embodiments, light may be scattered by oxide particles 112 partially or primarily via Mie scattering or an approximation of Mie scattering. Oxide particles 112 may preferentially scatter light having wavelengths in the visible spectrum. Infrared light having wavelengths longer than approximately 700 nm may also be scattered by oxide particles 112, but to a lesser extent. Accordingly, the resulting light scattered by light-scattering layer 104 and exiting from exterior surface 108 may have a combination of visible spectrum light, producing a gray or off-white appearance to external observers in conventionally lit environments (note that at least one particular color in the visible spectrum may be primarily scattered by light-scattering layer 104 and observed in environments that contain primarily that color light).

Figure 2:
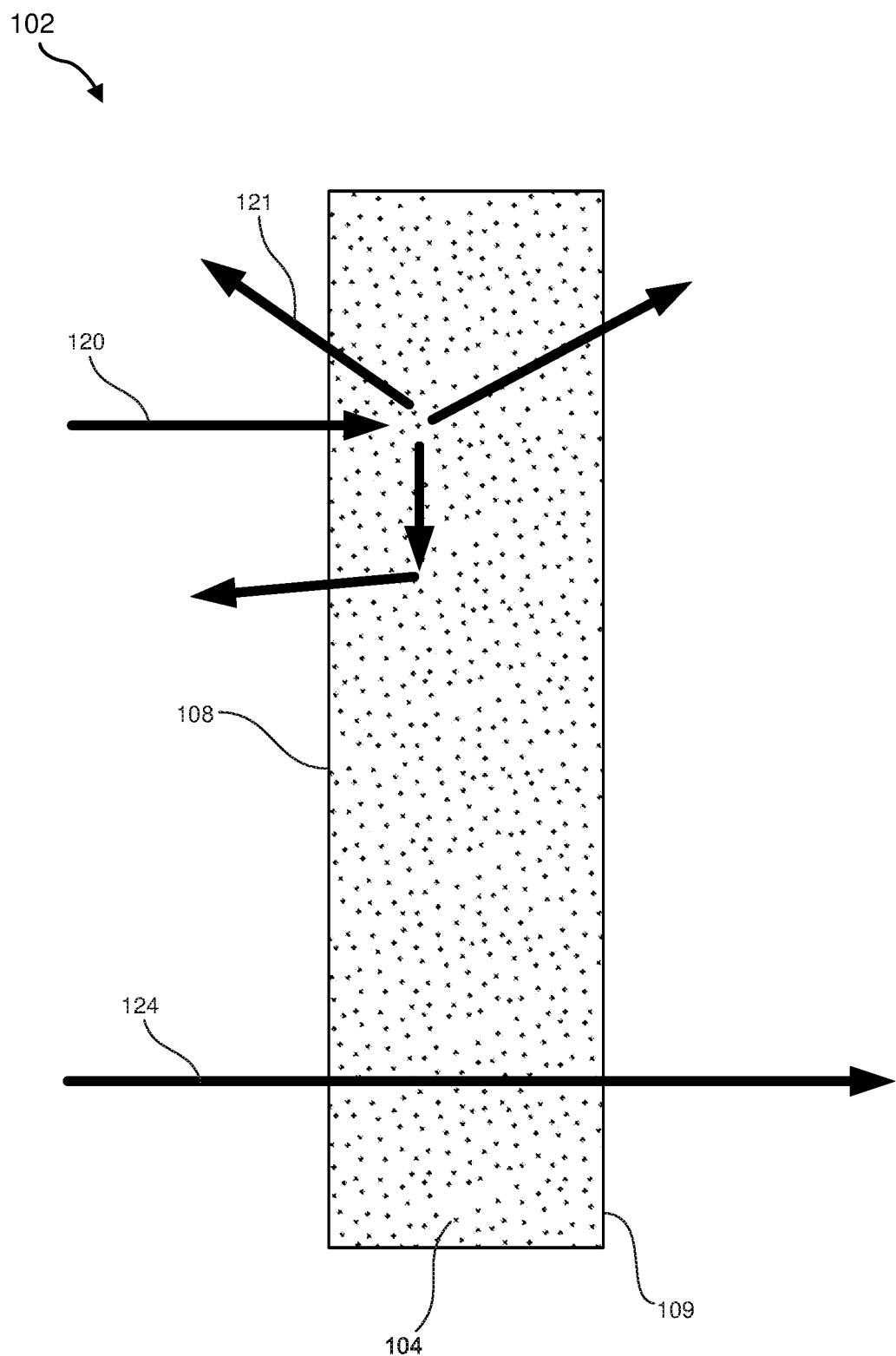
FIG. 2 is a cross-sectional view of an exemplary visible-light barrier in accordance with embodiments of this disclosure.

FIG. 2 shows a visible-light barrier 102 utilized, for example, in exemplary system 100 (see FIG. 1). Visible-light barrier 102 shown in this figure may include a light-scattering layer 104, such as that shown in FIG. 1. This figure also illustrates exemplary light paths through light-scattering layer 104 in accordance with some embodiments.

As shown in FIG. 2, light incident on exterior surface 108 of light-scattering layer 104 may be scattered by light-scattering layer 104 or transmitted through light-scattering layer 104. For example, visible spectrum light 120, and to a lesser extent other wavelengths of light (e.g., infrared light), may be scattered by oxide particles 112 in light-scattering layer 104 such that portions of scattered light 121 exit from exterior surface 108 and other portions of scattered light 121 exit from interior surface 109 of light-scattering layer 104.

In various embodiments, light-scattering layer 104 may preferentially transmit IR light over visible light. For example, a substantial portion of longer wavelength light passing through light-scattering layer 104, such as IR light 124 having wavelengths outside the visible spectrum, may pass through the entire thickness of light-scattering layer 104 between exterior surface 108 and interior surface 109. In some embodiments, light-scattering layer 104 may transmit a majority of incident IR light 124. Accordingly, IR light 124 may pass through light-scattering layer 104 with minimal blocking or interference. In at least one example, at least approximately 30% of infrared light incident on light-scattering layer 104 (e.g., at least approximately 35%, at least approximately 40%, at least approximately 45%, at least approximately 50%, or at least approximately 55% of incident infrared light) may be transmitted through light-scattering layer 104. In some examples, light-scattering layer 104 may be configured to transmit a selected proportion of IR light having a particular wavelength or range of wavelengths. In at least one example, visible-light barrier 102 may be configured to transmit at least IR light having wavelengths between approximately 800 nm and approximately 900 nm, such as wavelengths between approximately 840 nm and approximately 860 nm (e.g., IR light having wavelengths from approximately 845 nm to approximately 855 nm or a wavelength of approximately 850 nm).

Figure 3:
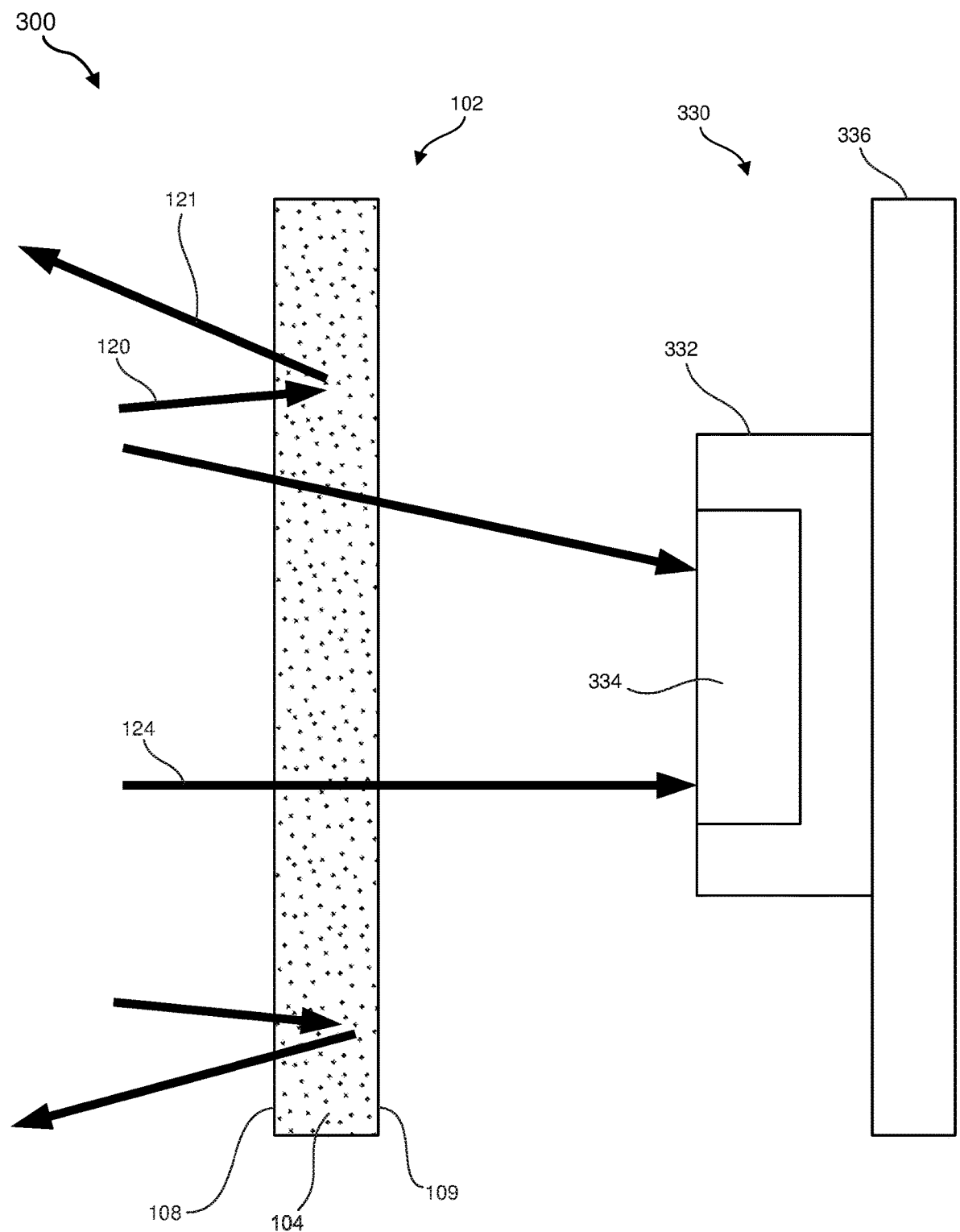
FIG. 3 is a cross-sectional view of an exemplary IR-sensor system that includes a visible-light barrier in accordance with embodiments of this disclosure.

IR light 124, as well as other wavelengths of light in at least some examples, may enter exterior surface 108 of light-scattering layer 104 from an external region of visible-light barrier 102 and may exit from interior surface 109 of light-scattering layer 104, passing into an internal region of system 100 covered and/or enclosed by visible-light barrier 102 (see, e.g., FIGS. 1 and 3). Additionally or alternatively, IR light generated and emitted by a source element within the internal region of system 100 may travel in a direction generally opposite the path of IR light 124 shown in FIG. 2, entering through interior surface 109 of light-scattering layer 104 and exiting from exterior surface 108 of light-scattering layer 104 into the external environment (see, e.g., FIGS. 1 and 4). In some embodiments, light-scattering layer 104 may overlap a portion of a device that does not include an IR emitter or sensor element or a region adjacent such an IR element. In each example, light-scattering layer 104 may provide a visibly opaque or substantially opaque barrier that blocks passage of at least a portion of visible light so as to prevent or obscure external views of internal components within the device.

In some embodiments, light-scattering layer 104 may include one or more pigments, in addition to light-transmissive material 114 and oxide particles 112 (see FIG. 1), to provide additional coloration. As such, light-scattering layer 104 may reflect and emit certain visible colors to a greater extent than others to provide a colored appearance that is not black, gray, or off-white.

FIG. 3 shows an exemplary IR-sensor system 300 for sensing IR light. IR-sensor system 300 may be utilized, for example, in detecting, tracking, and/or imaging IR light emitted from other sources, and/or for any other suitable purposes. In some examples, the IR-sensor may receive data transmitted via an IR light signal. As shown, system 300 may include a visible-light barrier 102 forming at least a portion of a housing or cover disposed over an IR-sensor device 330 so as to at least partially block external light other than IR light from reaching IR-sensor device 330. As described above, visible-light barrier 102 may include a light-scattering layer 104 with an exterior surface 108 facing the external environment and an interior surface 109 facing IR-sensor device 330. As shown in FIG. 3, IR-sensor device 330 may include at least one IR sensor 332 having a sensor element 334 that receives transmitted IR light. In some examples, IR-sensor device 330 may include an array of IR sensors 332. Sensor element 334 may include any suitable IR-sensor element, such as a photocell, that converts photons of IR light into electrons that may be received by IR sensor 332. In some examples, IR sensor 332 may be mounted on a base, such as a printed circuit board (PCB) 336 that includes circuitry for transmitting and/or processing signals from IR sensor 332.

As illustrated in FIG. 3, visible light 120, and to a lesser extent other wavelengths of light, may be scattered by light-scattering layer 104 such that portions of scattered light 121 are directed from exterior surface 108 of light-scattering layer 104. Scattered light 121 emitted from exterior surface 108 of light-scattering layer 104 may produce a visibly non-black appearance (e.g., a gray, off-white, or other suitable color) to an observer. Additionally, IR light 124 may be transmitted through light-scattering layer 104 to a greater extent than visible light 120. At least a portion of IR light 124 transmitted through light-scattering layer 104 may travel to sensor element 334 of IR sensor 332, which detects the incident IR light 124.

Figure 4:
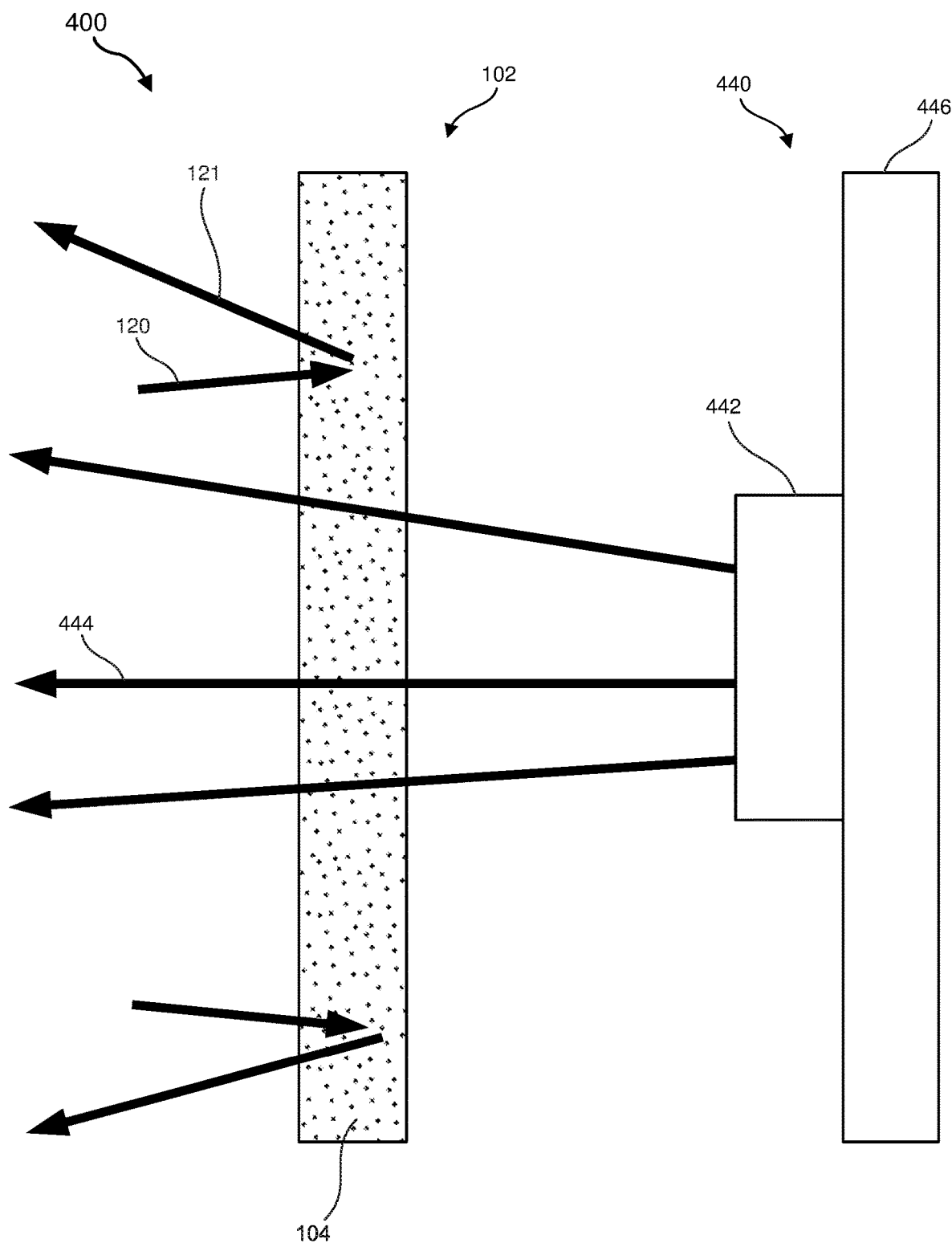
FIG. 4 is a cross-sectional view of an exemplary IR-emission system that includes a visible-light barrier in accordance with embodiments of this disclosure.

FIG. 4 shows an exemplary IR-emission system 400 for generating and emitting IR light. IR-emission system 400 may be utilized, for example, to emit IR light for use in detecting, tracking, and/or imaging activities and/or for any other suitable purpose. In some examples, the IR light may be used to transmit data and/or signals (e.g., device control signals) via an IR-light beam. As shown, system 400 may include a visible-light barrier 102 forming at least a portion of a housing or cover disposed over an IR-emission device 440 so as to at least partially block external light while allowing transmission of IR light 444 from IR-emission device 440 to an external environment. Visible-light barrier 102 may include a light-scattering layer 104 with an exterior surface 108 and an interior surface 109 facing IR-emission device 440. As shown in FIG. 4, IR-emission device 440 may include at least one IR emitter 442 having, for example, a light-emitting diode (LED) or other suitable IR emission element that generates and transmits IR light 444. In some examples, IR-emission device 440 may include an array of IR emitters 442. In at least one example, IR emitter 442 may be mounted on a base, such as a PCB 446 that includes circuitry for generating and transmitting IR light 444 via IR emitter 442.

As illustrated in FIG. 4, visible light 120, and, to a lesser extent, other wavelengths of light, may be scattered by light-scattering layer 104. Additionally, a substantial portion of longer wavelength light passing through light-scattering layer 104, such as IR light 444 emitted by IR emitter 442, may travel through light-scattering layer 104 and may be emitted from exterior surface 108 into the external environment, where at least a portion of the IR light 444 may be received by one or more other IR sensors (e.g., IR sensor 332 in FIG. 3). According to at least one example, IR-sensor device 330 and IR-emission device 440 may be disposed on separate components and/or devices. Additionally or alternatively, while IR-sensor device 330 and IR-emission device 440 are separately illustrated in FIGS. 3 and 4, in at least some embodiments, IR-sensor device 330 and IR-emission device 440 may be located in the same device and/or component, such as a proximity sensor or mapping device that includes both an IR emitter (e.g., a projector that includes an IR light source) and a sensor array for detecting objects and surfaces in the local environment.

Figure 5:
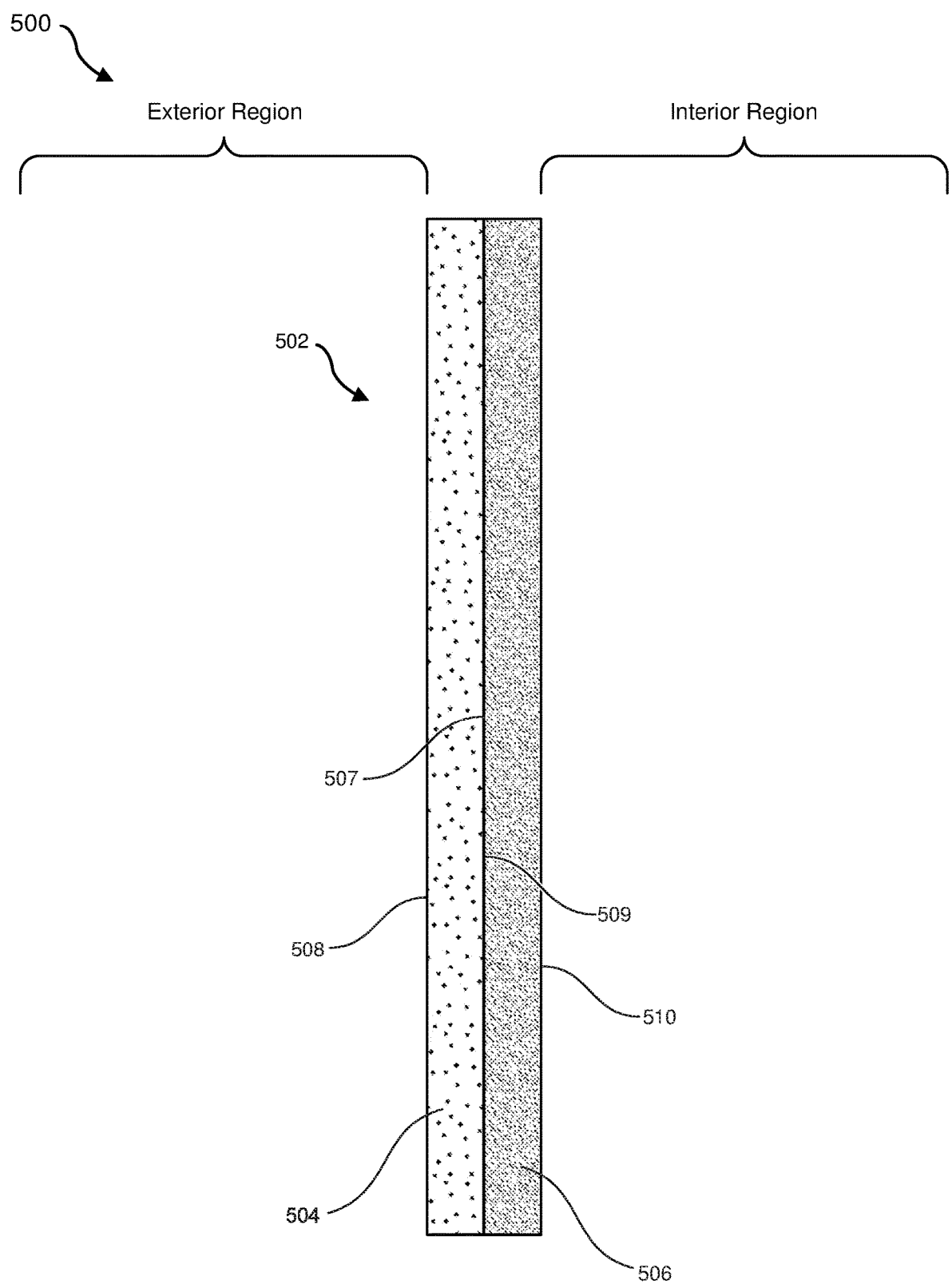
FIG. 5 is an illustration of an exemplary system for selectively transmitting infrared light through a device exterior surface having non-black coloration in accordance with embodiments of this disclosure.

FIG. 5 shows an exemplary system 500, such as an IR transmission system for sending or receiving IR light. As shown, system 500 may include a visible-light barrier 502 that includes a light-scattering layer 504 overlapping an IR-transmissive layer 506. Visible-light barrier 502 may be any suitable member disposed between an interior region of a device and an exterior region surrounding the device. For example, visible-light barrier 502 may be an enclosure, such as a housing or cover, or a portion thereof, or any other suitable blocking layer that filters out and/or scatters at least a portion of light (e.g., visible light) outside a desired wavelength range (e.g., IR light). While various embodiments disclosed herein describe and show visible-light barrier 502 disposed over IR emitting and/or receiving components, in some examples, visible-light barrier 502 may additionally or alternatively cover portions of a device that do not include such IR components. For example, visible-light barrier 502 may cover a substantial portion of a head-mounted-display device such that portions of visible-light barrier 502 extend over multiple IR emitters (e.g., IR LEDs) and/or IR sensors as well as portions of the display device between and/or surrounding the IR emitter and/or sensor locations. In additional examples, visible-light barrier 502 may form an exterior portion of the device that does not include IR emitting or receiving components. For example, visible-light barrier 502 may be utilized to provide a unique coloration and/or look to a device that does not utilize IR technology.

According to at least one embodiment, IR-transmissive layer 506 may include a material that substantially blocks transmission of visible light. For example, IR-transmissive layer 506 may include one or more pigment compounds that give the layer a dark or black and opaque appearance. IR-transmissive layer 506 may substantially block transmission of light that is visible to the typical human eye—i.e., light in the visible spectrum, which includes light having wavelengths from about 380 nm up to about 740 nm. In various examples, IR-transmissive layer 506 may also block at least some light having wavelengths outside the visible spectrum. IR-transmissive layer 506 may substantially block the transmission of visible light by blocking at least about 95% of light in the visible spectrum (e.g., at least about 96%, 97%, 98%, or 99% of visible light).

IR-transmissive layer 506 may include any suitable base material, such as an opaque polymer material. In at least one example, IR-transmissive layer 506 may be formed of a polymer material that transmits IR light, such as acrylonitrile butadiene styrene (ABS), polycarbonate, acrylate, epoxy, polyimide and/or any other suitable polymer. IR-transmissive layer 506 may include an interior surface 510 facing and/or surrounding at least a portion of the illustrated interior region of the device. Additionally, IR-transmissive layer 506 may have an exterior-facing surface 507 facing away from the interior region and toward the exterior region. IR-transmissive layer 506 may have any suitable thickness between exterior-facing surface 507 and interior surface 510, such as a thickness of from approximately 1 mm to approximately 5 mm (e.g., approximately 1 mm, approximately 2 mm, approximately 3 mm, approximately 4 mm, approximately 5 mm, or greater).

Light-scattering layer 504 may be disposed overlapping exterior-facing surface 507 of IR-transmissive layer 506 such that light-scattering layer 504 is disposed between IR-transmissive layer 506 and the exterior region. In some embodiments, light-scattering layer 504 may be positioned adjacent to, abutting, and/or in contact with IR-transmissive layer 506. For example, light-scattering layer 504 may be directly bonded and/or fastened to IR-transmissive layer 506. In some examples, an adhesive agent may be sandwiched between light-scattering layer 504 and IR-transmissive layer 506 to bond light-scattering layer 504 to IR-transmissive layer 506. In at least one example, light-scattering layer 504 may be directly bonded to IR-transmissive layer 506 without an additional adhesive composition. In at least one example, visible-light barrier 502 may include one or more layers in addition to light-scattering layer 504 and IR-transmissive layer 506. For example, light-scattering layer 504 may be separated from IR-transmissive layer 506 by an additional layer and/or by an air gap. Additionally or alternatively, one or more additional layers may be disposed on interior surface 510 of IR-transmissive layer 506 and/or on an exterior surface 508 of light-scattering layer 504.

Light-scattering layer 504 may have any suitable thickness between exterior surface 508 and interior-facing surface 509, such as a thickness of from approximately 5 μm to approximately 1 mm (e.g., approximately 5 μm, approximately 10 μm, approximately 15 μm, approximately 20 μm, approximately 25 μm, approximately 30 μm, approximately 35 μm, approximately 40 μm, approximately 45 μm, approximately 50 μm, approximately 60 μm, approximately 70 μm, approximately 80 μm, approximately 90 μm, approximately 100 μm, approximately 200 μm, approximately 300 μm, approximately 400 μm, approximately 500 μm, approximately 600 μm, approximately 700 μm, approximately 800 μm, approximately 900 μm, approximately 1000 μm, or greater).

Light-scattering layer 504 may include a light-transmissive material (see, e.g., light-transmissive material 114 in FIG. 1) that is a transparent or translucent solid material surrounding $TiO_2$ and/or ZnO particles (see, e.g., oxide particles 112 in FIG. 1) dispersed throughout light-scattering layer 504. For example, light-transmissive material 514 may be a polymeric material formed from a resin or coating layer. In some examples, light-transmissive material 514 may include one or more polymer materials, such as an acrylate, styrene, polyester, polycarbonate, epoxy, halogenated polymer, silicone, and/or other suitable polymer. In at least one embodiment, light-scattering layer 504 may be formed from a coating (e.g., a paint layer) that includes oxide particles (see, e.g., oxide particles 112 in FIG. 1) dispersed within a precursor mixture that is polymerized to form the light-transmissive material (see, e.g., light-transmissive material 114 in FIG. 1). Such a coating layer may, for example, be applied directly to exterior-facing surface 507 of IR-transmissive layer 506 and/or to a layer overlapping IR-transmissive layer 506. The coating layer may then be dried and/or cured (e.g., via exposure to heat, ultraviolet light, etc.) to produce light-scattering layer 504.

In at least one embodiment, light-scattering layer 504 may be produced from a curable mixture, such as a resin composition in which oxide particles 112 are dispersed. In some examples, IR-transmissive layer 506 and/or light-scattering layer 504 may be formed from a thermoplastic polymer resin material that is molded via, for example, injection molding or any other suitable process. In at least one example, IR-transmissive layer 506 and light-scattering layer 504 may both be integrally formed from separate compositions via a 2-shot injection molding process. In various examples, a polymer-forming mixture may first be hardened (e.g., via curing, cooling, and/or drying) to form light-scattering layer 504, which may then be directly or indirectly attached to a preformed IR-transmissive layer 506 via, for example, bonding and/or mechanical fastening.

Figure 6:
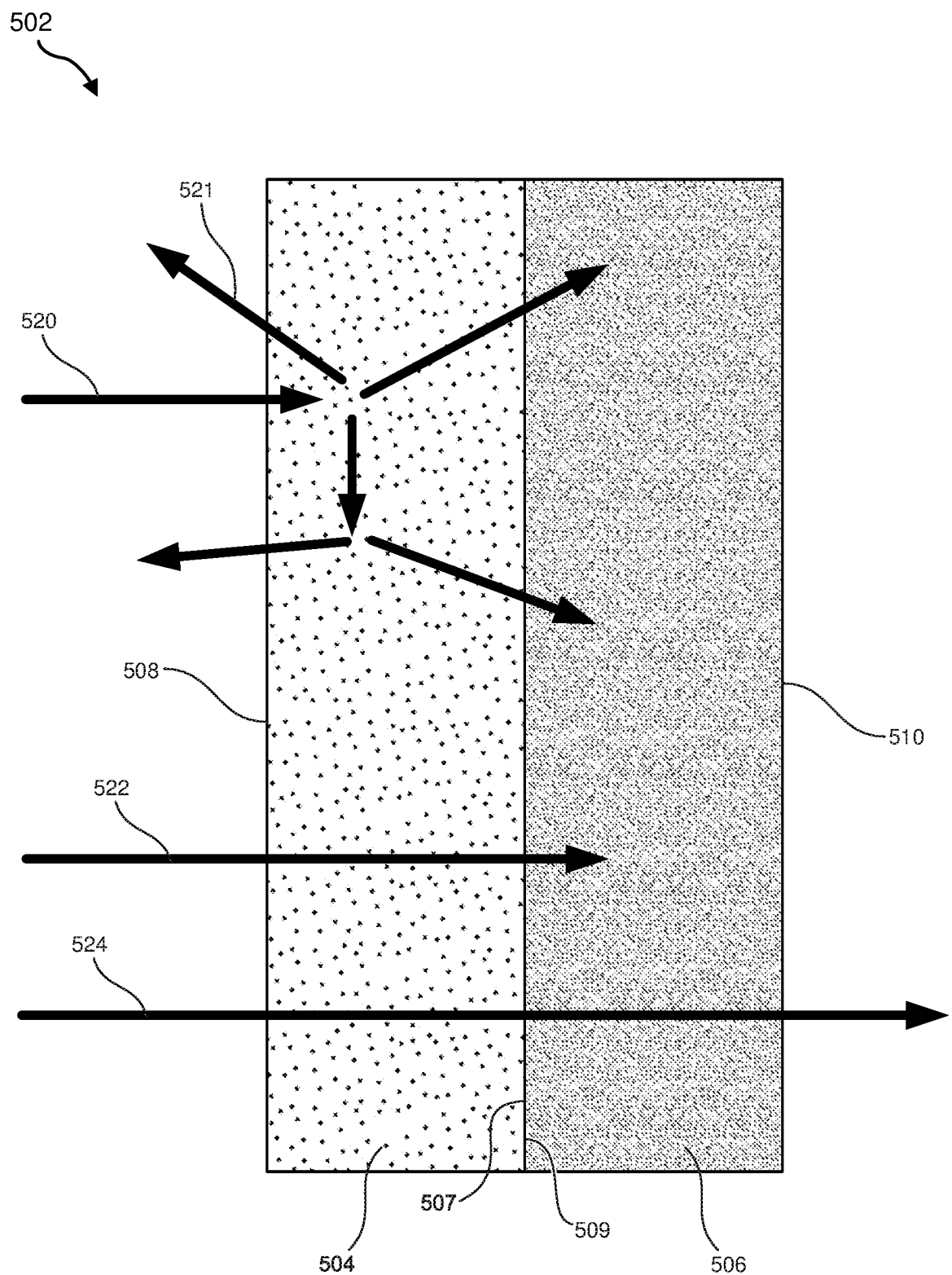
FIG. 6 is a cross-sectional view of an exemplary multi-layered visible-light barrier in accordance with embodiments of this disclosure.

FIG. 6 shows a visible-light barrier 502 utilized, for example, in exemplary system 500 (see FIG. 5). Visible-light barrier 502 shown in this figure may include a light-scattering layer 504, such as that shown in FIG. 5. This figure further illustrates exemplary light paths through light-scattering layer 504 and IR-transmissive layer 506 in accordance with some embodiments.

As shown in FIG. 6, light incident on exterior surface 508 of light-scattering layer 504 may be scattered by light-scattering layer 504 or transmitted through light-scattering layer 504. For example, visible light 520, and to a lesser extent other wavelengths of light, may be scattered by oxide particles (e.g., oxide particles 112) in light-scattering layer 504 such that portions of scattered light 521 exit from exterior surface 508 and other portions of scattered light 521 exit light-scattering layer 504 through interior-facing surface 509. As described above, scattered light 521 emitted from exterior surface 508 of light-scattering layer 504 may produce a gray or off-white appearance to an observer. Additionally, scattered light 521 directed through interior-facing surface 509 may be absorbed by and/or may pass through IR-transmissive layer 506. For example, visible spectrum light, such as a portion of scattered light 521 from light-scattering layer 504, may be incident on exterior-facing surface 507 of IR-transmissive layer 506. Additionally, transmitted light 522 illustrated in FIG. 6 may include visible light that is transmitted through light-scattering layer 504 to IR-transmissive layer 506 without being scattered. As illustrated, transmitted light 522 and IR light 524 may pass through light-scattering layer 504 and may be incident on exterior-facing surface 507 of IR-transmissive layer 506.

As illustrated, non-IR light, including at least a portion of transmitted light 522 that is not scattered, as well as a portion of scattered light 521 scattered by light-scattering layer 504 toward IR-transmissive layer 506, may be substantially absorbed by light-blocking components, such as dark pigments, included in IR-transmissive layer 506. In at least one example, IR-transmissive layer 506 may substantially absorb light having wavelengths in the visible spectrum, and in some examples, IR-transmissive layer 506 may absorb approximately 95% or more of the visible light. A high proportion of visible light passing through light-scattering layer 504 and exiting interior-facing surface 509 may be absorbed by IR-transmissive layer 506 rather than being reflected by IR-transmissive layer 506. Additionally, at least a portion of incident light, such as visible light 520, may be scattered by oxide particles of light-scattering layer 504 and may be emitted from exterior surface 508 into the external environment. Because non-IR light, including transmitted light 522 and scattered light 521 shown in FIG. 6, may be absorbed by IR-transmissive layer 506, such light may be blocked from passing through IR-transmissive layer 506 to an IR light element in the interior region of a device. Accordingly, such a configuration may prevent a significant portion of non-IR light, including visible light, from entering the device interior and negatively affecting various IR devices, such as IR sensors (see, e.g., FIG. 3) that may be adversely affected by higher levels of visible light.

In various embodiments, IR-transmissive layer 506 may preferentially transmit IR light over visible light. For example, a substantial portion of longer wavelength light passing through light-scattering layer 504, such as IR light 524 having wavelengths outside the visible spectrum, may pass through the entire thickness of IR-transmissive layer 506 between exterior-facing surface 507 and interior surface 510. In some embodiments, IR-transmissive layer 506 may transmit a majority of IR light 524 incident on IR-transmissive layer 506. Accordingly, IR light 524 may pass through both light-scattering layer 504 and IR-transmissive layer 506 with minimal blocking or interference. In at least one example, at least approximately 30% of infrared light incident on light-scattering layer 504 (e.g., at least approximately 35%, at least approximately 40%, at least approximately 45%, at least approximately 50%, or at least approximately 55% of incident infrared light) may be transmitted through both light-scattering layer 504 and IR-transmissive layer 506 of visible-light barrier 502. In some examples, visible-light barrier 502 may be configured to transmit a selected proportion of IR light having a particular wavelength or range of wavelengths. In at least one example, visible-light barrier 502 may be configured to transmit at least IR light having wavelengths between approximately 800 nm and approximately 900 nm, such as wavelengths between approximately 840 nm and approximately 860 nm (e.g., IR light having wavelengths from approximately 845 nm to approximately 855 nm or a wavelength of approximately 850 nm).

IR light 524 may enter light-scattering layer 504 from an external region of visible-light barrier 502 and may exit from interior surface 510 of IR-transmissive layer 506, passing into an internal region of system 500 surrounded by visible-light barrier 502 (see, e.g., FIGS. 5 and 6). Additionally or alternatively, IR light generated and emitted by a source element within the internal region of system 500 may travel in a direction generally opposite the path of IR light 524 shown in FIG. 6, passing first through IR-transmissive layer 506, then through light-scattering layer 504, and exiting from exterior surface 508 of light-scattering layer 504 into the external environment (see, e.g., FIGS. 4 and 5). In some embodiments, light-scattering layer 504 may overlap IR-transmissive layer 506 or a portion of IR-transmissive layer 506 that does not overlap an IR emitter or sensor element or a region adjacent such an IR element. In these examples, IR-transmissive layer 506, a portion thereof, and/or another overlapping layer may include a material that blocks a substantial portion of IR light due to the thickness and/or material composition of IR-transmissive layer 506. Regardless of the proportion of IR light passed through IR-transmissive layer 506, light-scattering layer 504 may nonetheless function to scatter light, such as visible spectrum light, so as to give any suitable surface a desired look and coloration. Accordingly, a housing having some regions formed over IR-functional elements (e.g., IR transmitters and/or sensors) and other regions not formed over such IR-functional elements may have a consistent appearance and/or coloration over each of the various regions.

In some embodiments, IR-transmissive layer 506 and/or light-scattering layer 504 may have a slight coloration so that IR-transmissive layer 506 is not fully black in color and/or so that light-scattering layer 504 has a tinted coloration. In such an example, IR-transmissive layer 506 may absorb most but not all visible light, with light having certain wavelengths being reflected by IR-transmissive layer 506. The visible light scattered by light-scattering layer 504 may combine with the light reflected by IR-transmissive layer 506 to shift the color perceived to, for example, a more red, green, and/or blue color. IR-transmissive layer 506 and/or light-scattering layer 504 may include any suitable coloration to reflect one or more desired light colors that combine with the visible spectrum light scattered by light-scattering layer 504.

In additional embodiments, IR-transmissive layer 506 may be a partially or fully transparent or translucent layer. As with visible-light barrier 102 described herein, at least some visible light may pass from light-scattering layer 504 to an interior region of a device via the transparent or translucent layer IR-transmissive layer 506. In this example, the visible-light barrier 502 may block, via scattering in light-scattering layer 504, an amount of visible light sufficient to obscure or block an external view of the device interior while not necessarily preventing a substantial amount of additional light from entering the device interior. Such a configuration may also facilitate transmission of a greater proportion of IR light through visible-light barrier 502, which may be useful in covers for certain IR devices, such as IR transmitters (see, e.g., FIG. 4), for which visible light entering the enclosed device interior may have little or no negative effect on the IR light transmission.

Figure 7:
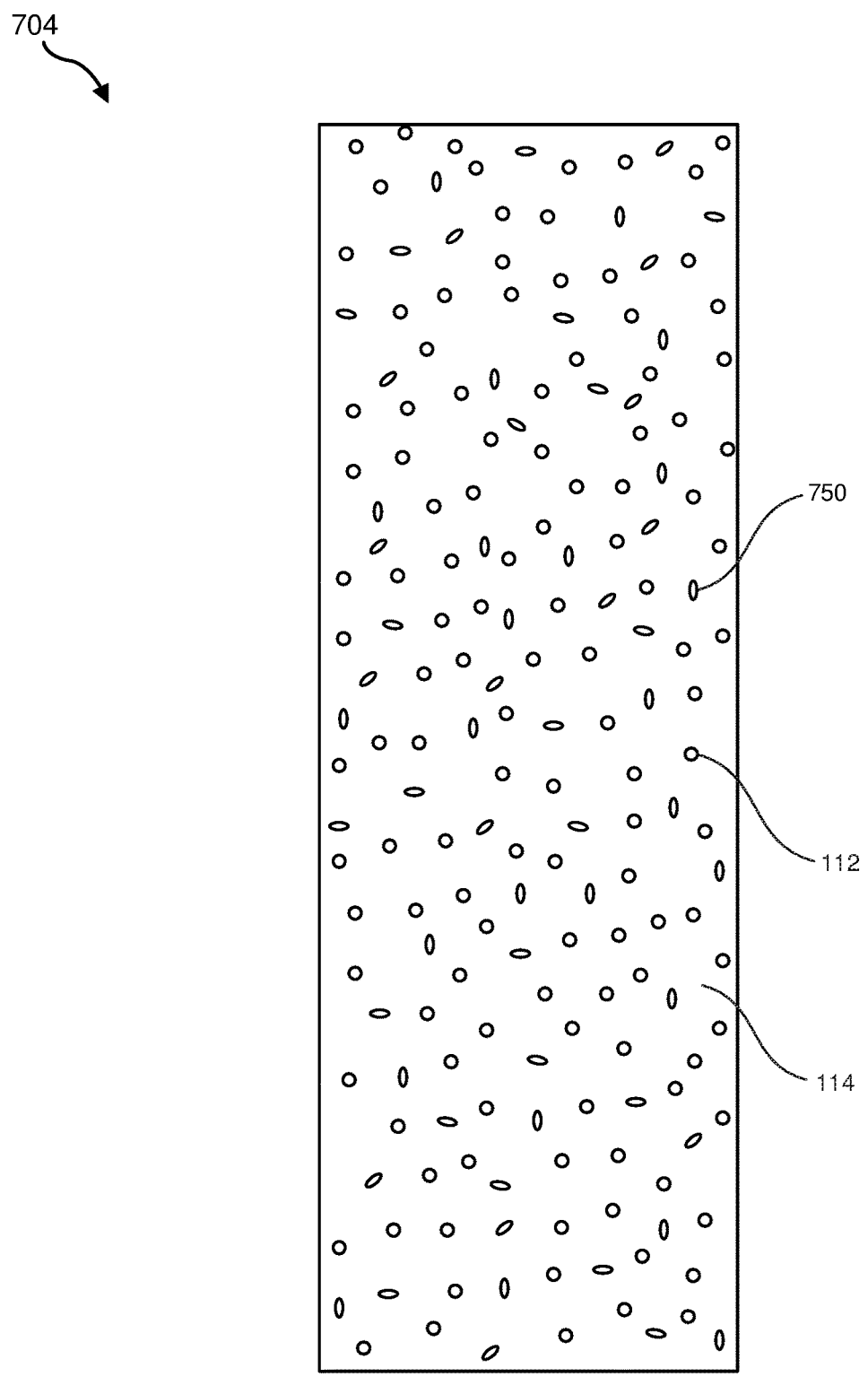
FIG. 7 is a cross-sectional view of an exemplary light-scattering layer that includes oxide particles and mica particles in accordance with embodiments of this disclosure.

FIG. 7 shows a light-scattering layer 704 that may be utilized, for example, in an exemplary visible-light barrier, such as visible-light barrier 102 shown in FIGS. 1-4 and/or visible-light barrier 502 shown in FIGS. 5 and 6, with light-scattering layer 704 replacing light-scattering layer 104 and/or 504. As with light-scattering layer 104, light-scattering layer 704 may include oxide particles 112, such as $TiO_2$ and/or ZnO particles, that may be sized to preferentially scatter visible spectrum light over light having greater wavelengths, such as IR light. Additionally, light-scattering layer 704 may include a diffusing agent to further scatter incident light. For example, a submicron scale particulate diffusing agent, such as mica particles 750, may be dispersed within light-transmissive material 114 of light-scattering layer 704 in addition to oxide particles 112. In some embodiments, mica particles 750 may have an average particle size between approximately 400 nm and approximately 700 nm (e.g., approximately 450 nm, approximately 500 nm, approximately 550 nm, approximately 600 nm, approximately 650 nm). Mica particles 750 may be present in light-scattering layer 704 and/or a precursor mixture for forming light-scattering layer 704 at any suitable concentration, such as a concentration of less than approximately 0.1% by weight (e.g., from approximately 0.03% to approximately 0.08% by weight, approximately 0.05% by weight). Light-scattering layer 704 may also include oxide particles 112 at any suitable concentration, such as a concentration of from approximately 0.02 wt % to approximately 2 wt % (e.g., from 0.05 wt % to approximately 1.5 wt %, approximately 1 wt %). According to at least one embodiment, mica particles 750 in light-scattering layer 704 may mildly scatter visible light and enhance overall scattering of visible light while not affecting or only minimally affecting IR light transmission through light-scattering layer 704. In some examples, mica particles 750 may produce the visual appearance of a diffuse haze in light-scattering layer 704 and may further enhance scattering of visible light that is emitted from light-scattering layer 704 toward an observer.

Figure 8:
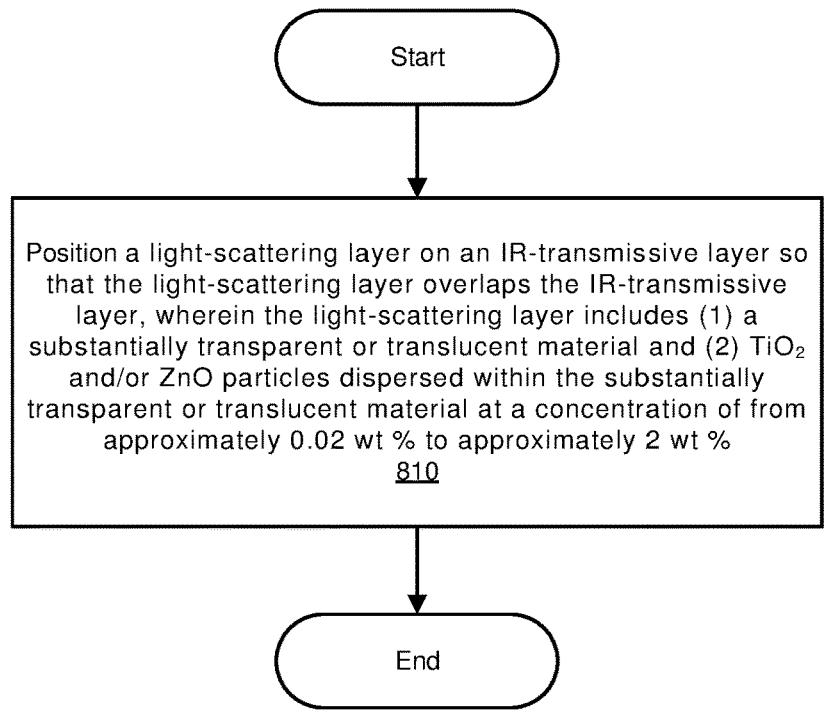
FIG. 8 is a flow diagram of an exemplary method for producing a multilayered visible-light barrier according to some embodiments.

FIG. 8 is a flow diagram of an exemplary method 800 for producing a visible-light barrier in accordance with various embodiments. As illustrated in FIG. 8, at step 810, a light-scattering layer may be positioned on an IR-transmissive layer so that the light-scattering layer overlaps the IR-transmissive layer. For example, light-scattering layer 504 may be positioned on an IR-transmissive layer, such as an IR-transmissive layer 506, so that light-scattering layer 504 overlaps the IR-transmissive layer 506 (see, e.g., FIGS. 5 and 6).

In various embodiments, the light-scattering layer may include (1) a substantially transparent or translucent material and (2) at least one of $TiO_2$ or ZnO particles dispersed within the substantially transparent or translucent material at a concentration of from approximately 0.02 wt % to approximately 2 wt %. For example, light-scattering layer 504 may include a substantially transparent or translucent material (e.g., light-transmissive material 114). Additionally, light-scattering layer 504 may include at least one of $TiO_2$ or ZnO particles (e.g., oxide particles 112) dispersed within the substantially transparent or translucent material at a concentration of from approximately 0.02 wt % to approximately 2 wt % (see, e.g., FIGS. 1 and 5-7).

In some embodiments, positioning light-scattering layer 504 on IR-transmissive layer 506 may include (1) depositing a polymer-forming mixture including oxide particles 112 on the IR-transmissive layer 506, and (2) hardening the polymer-forming mixture (e.g., via curing, cooling, and/or drying) to form light-scattering layer 504. The polymer-forming mixture may, for example, be a coating layer, such as a paint or resin layer, that is applied directly or indirectly to IR-transmissive layer 506. The coating layer may then be polymerized and/or solidified by drying, cooling, and/or curing (e.g., via exposure to heat, ultraviolet light, etc.) to form light-scattering layer 504.

In certain embodiments, positioning light-scattering layer 504 on IR-transmissive layer 506 may include coupling light-scattering layer 504 to IR-transmissive layer 506. For example, light-scattering layer 504 may be a preformed and solidified layer that is positioned over IR-transmissive layer 506. The light-scattering layer 504 may then be coupled to IR-transmissive layer 506 in any suitable manner (e.g., via direct or indirect bonding and/or mechanical fastening) to produce visible-light barrier 502.

Figure 9:
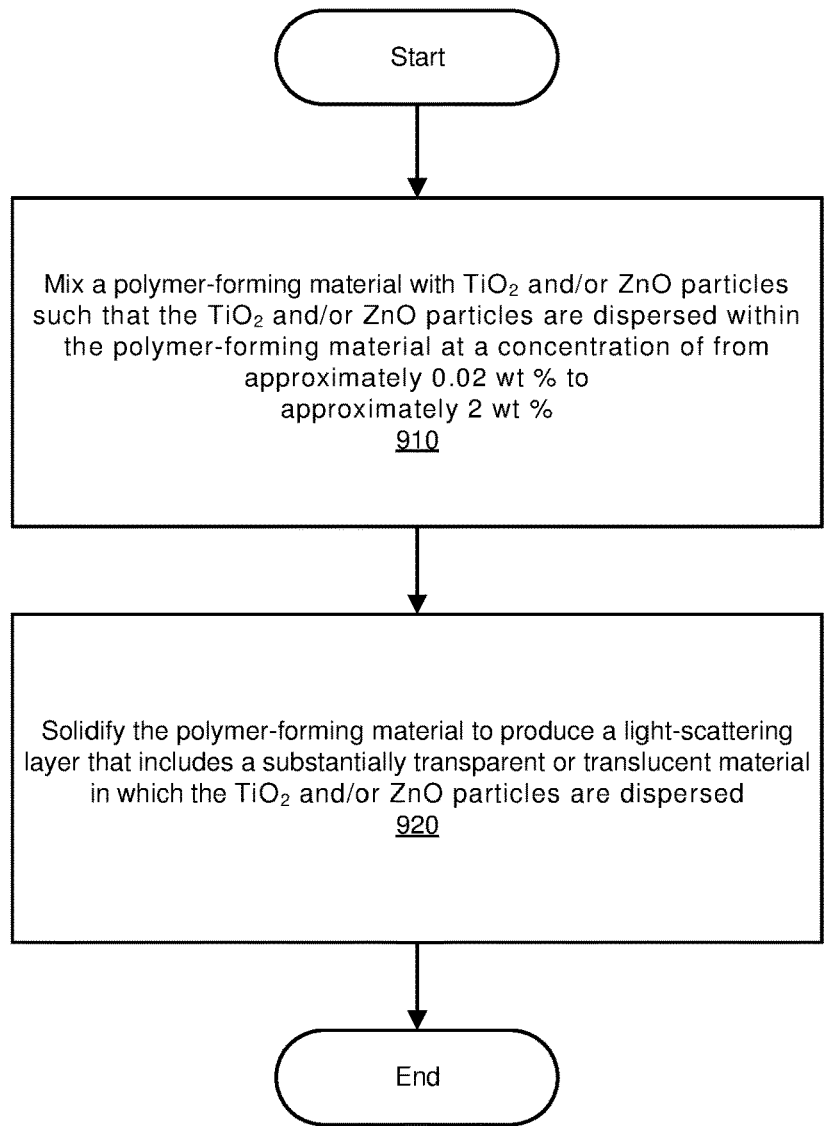
FIG. 9 is a flow diagram of an exemplary method for producing a visible-light barrier according to some embodiments.

FIG. 9 is a flow diagram of an exemplary method 900 for producing a visible-light barrier in accordance with various embodiments. As illustrated in FIG. 9, at step 910, a polymer-forming material may be mixed with $TiO_2$ and/or ZnO particles such that the $TiO_2$ and/or ZnO particles are dispersed within the polymer-forming material at a concentration of from approximately 0.02 wt % to approximately 2 wt %. For example, a polymer-forming resin (e.g., a curable or thermoplastic resin) or coating material (e.g., a paint base material) may be mixed with $TiO_2$ and/or ZnO particles (e.g., oxide particles 112) such that the $TiO_2$ and/or ZnO particles are dispersed within the polymer-forming material at a concentration of from approximately 0.02 wt % to approximately 2 wt % (see, e.g., FIGS. 1, 2, and 5-7).

At step 920 in FIG. 9, the polymer-forming material may be solidified to produce a light-scattering layer that includes a substantially transparent or translucent material in which the TiO2 and/or ZnO particles are dispersed. For example, the polymer-forming material may be hardened via curing, cooling, and/or drying to produce light-scattering layer 104 that includes a substantially transparent or translucent material (e.g., light-transmissive material 114) in which the TiO2 and/or ZnO particles (e.g., oxide particles 112) are dispersed (see, e.g., FIGS. 1, 2, and 5-7).

FIGS. 10-14 show devices having multilayered housings, covers, and/or other articles that include light-scattering layers in accordance with various embodiments. The devices illustrated in these figures are exemplary in nature and not exhaustive. The visible-light barriers disclosed herein and illustrated in the figures may additionally or alternatively be utilized in any other suitable devices without limitation.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (e.g., augmented-reality systems, such as smart glasses or any other suitable head-mounted display) or that visually immerses a user in an artificial reality (such as, e.g., virtual-reality system 1000 in FIG. 10). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

As noted, some artificial-reality systems may substantially replace one or more of a user's sensory perceptions of the real world with a virtual experience. One example of this type of system is a head-worn display system, such as virtual-reality system 1000 in FIG. 10, that mostly or completely covers a user's field of view. Virtual-reality system 1000 may include a front rigid body 1002 and a band 1004 shaped to fit around a user's head. Virtual-reality system 1000 may also include output audio transducers 1006(A) and 1006(B). Furthermore, while not shown in FIG. 10, front rigid body 1002 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in virtual-reality system 1000 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some the artificial-reality systems described herein may include one or more projection systems. For example, display devices in virtual-reality system 1000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, virtual-reality system 1000 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

Some augmented-reality systems may map a user's and/or device's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, Bluetooth, global positioning system (GPS), cellular or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. Augmented-reality and virtual-reality devices (such as virtual-reality system 1000 of FIG. 10) may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

End of Boilerplate

Figure 10:
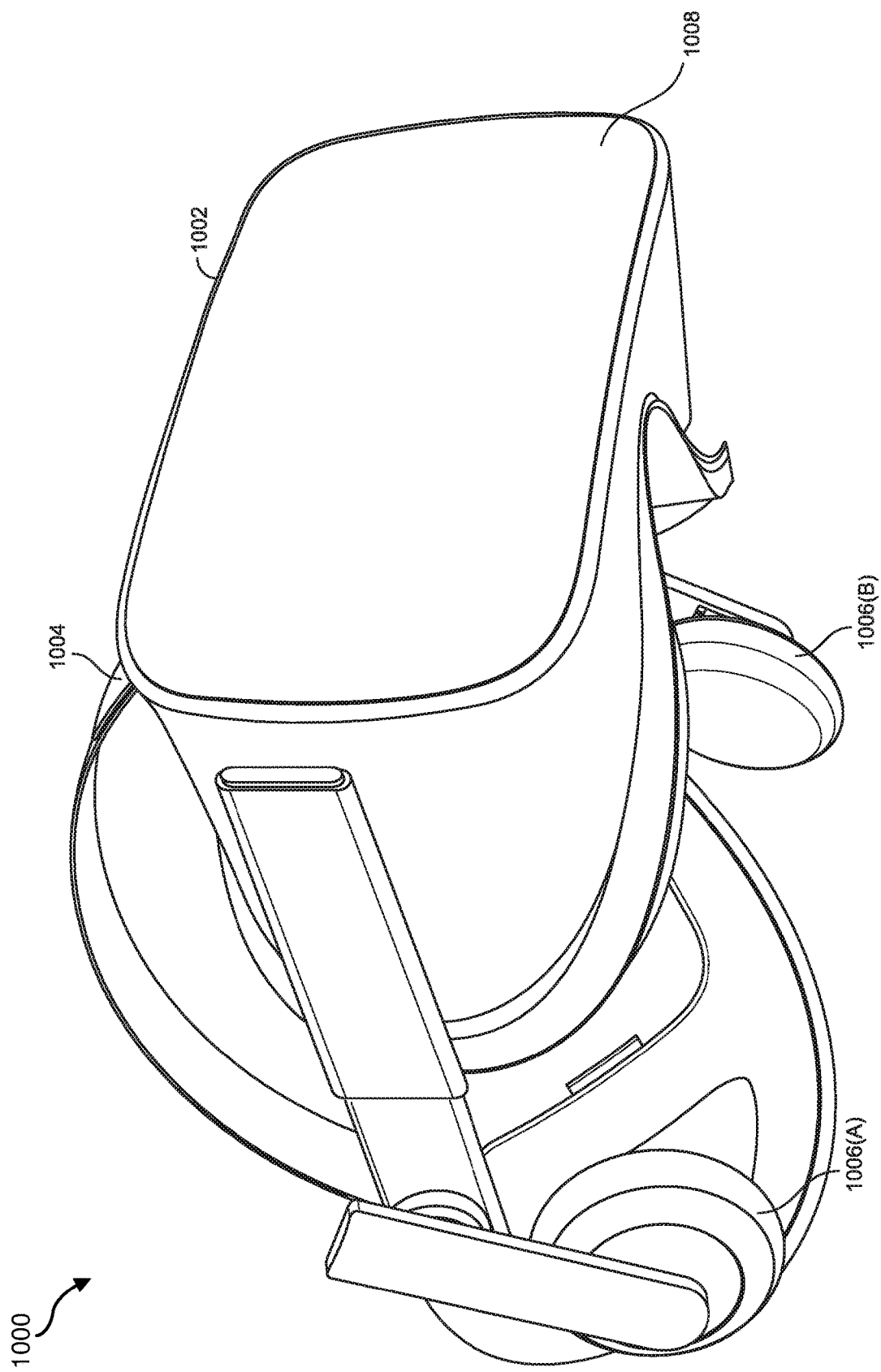
FIG. 10 is an illustration of an exemplary virtual-reality headset that may be used in connection with embodiments of this disclosure.

In some embodiments, as shown in FIG. 10, front rigid body 1002 of virtual-reality system 1000 may include an outer housing layer 1008 surrounding internal components of the device. In various embodiments, tracking lights, such as IR LEDs (see, e.g., tracking lights 1108 in FIG. 11), may be located at a plurality of separate positions in front rigid body 1002 and/or other suitable locations, such as a portion of band 1004 (e.g., a backpiece portion positioned to contact a back of a user's head). The IR LEDs may be utilized in conjunction with, for example, one or more external sensors to track the location and/or bodily position of a wearer. The IR LEDs may be covered by at least a portion of housing layer 1008, which may function as a visible-light barrier (see, e.g., visible-light barrier 102/502 in FIGS. 1-7) to obscure views of internal components while allowing passage of IR light. The visible-light barrier may give corresponding portions of housing layer 1008 a non-black coloration (e.g., gray, off-white, etc.) via light scattering. In some examples, one or more IR sensors may additionally or alternatively be located in front rigid body 1002 and may be covered by portions of housing layer 1008 that include the visible-light barrier.

Figure 11:
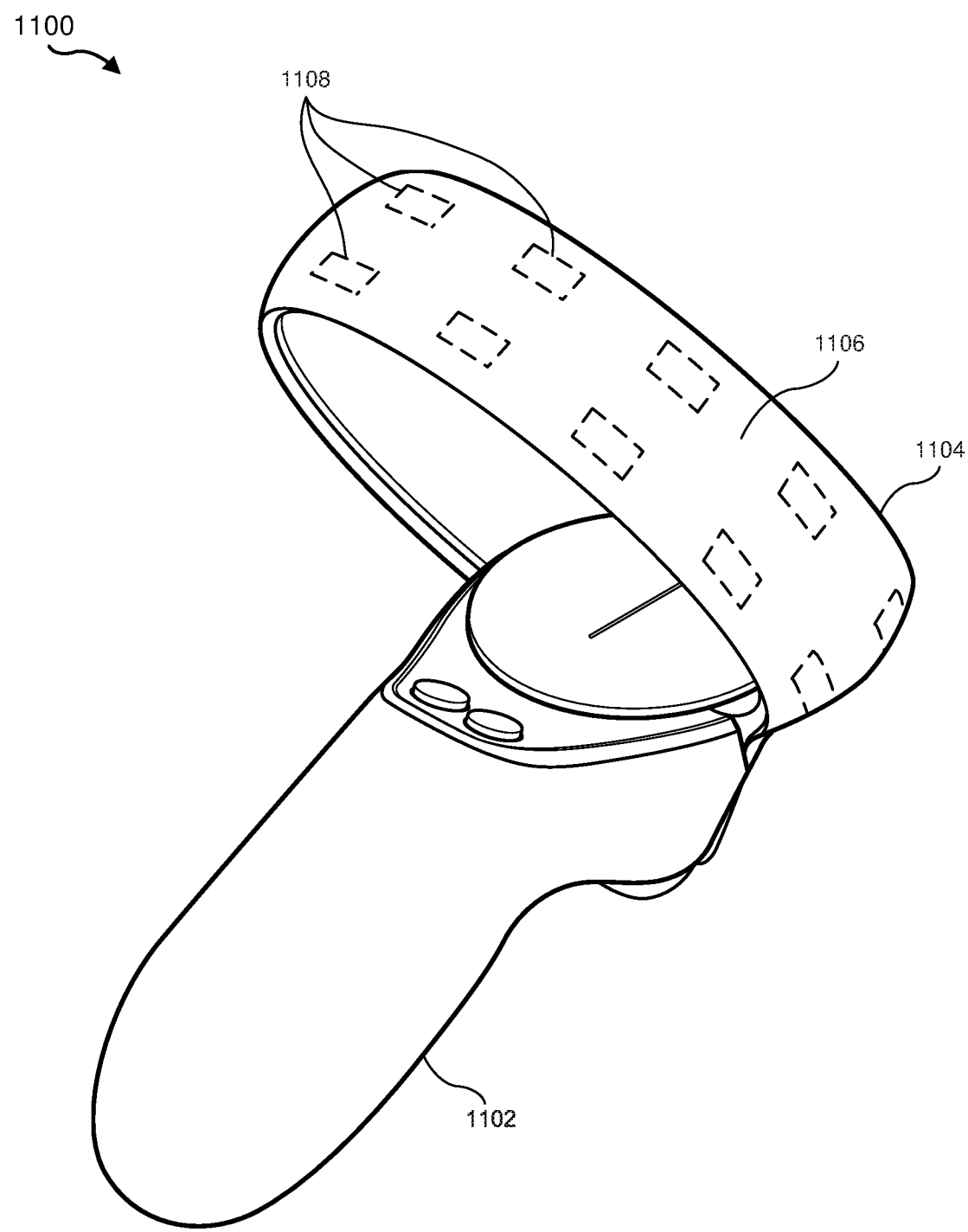
FIG. 11 is an illustration of an exemplary hand-held controller that may be used in connection with embodiments of this disclosure.

FIG. 11 illustrates an exemplary hand-held controller 1100 that may be utilized with, for example, virtual-reality system 1000 in FIG. 10. In some embodiments, hand-held controller 1100 may be communicatively coupled to virtual-reality system 1000 and/or to a computing device (e.g., a personal computer, a console, etc.) communicatively coupled to virtual-reality system 1000. As shown in FIG. 11, hand-held controller 1100 may include a grip 1102 sized to fit within a user's right or left hand. Hand-held controller 1100 may also include a tracking loop 1104 for tracking position, orientation, and/or movement of hand-held controller 1100 with respect to virtual-reality system 1000 and/or with respect to a local environment. Tracking loop 1104 may include an array of tracking lights 1108, such as IR light emitters (e.g., IR LEDs), that are used for motion and positional tracking purposes to provide 360-degree motion control while using to virtual-reality system 1000. Tracking lights 1108 may be covered by at least a portion of a cover layer 1106, which may function as a visible-light barrier (see, e.g., visible-light barrier 102/502 in FIGS. 1-7) having a non-black coloration that obscures views of internal components while allowing passage of IR light.

Figure 12:
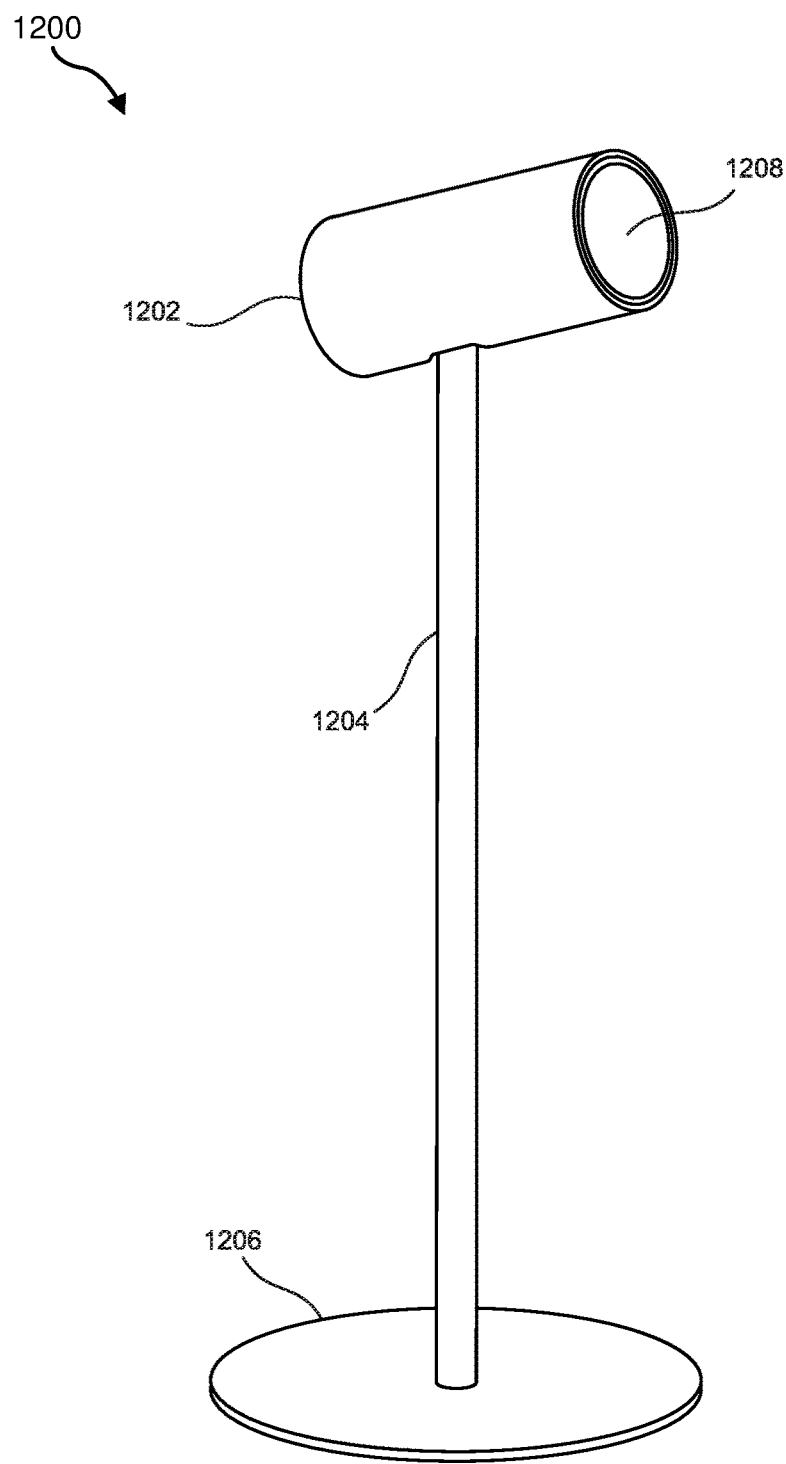
FIG. 12 is an illustration of an exemplary sensor device that may be used in connection with embodiments of this disclosure.

FIG. 12 illustrates an exemplary sensor device 1200 that may be utilized with, for example, virtual-reality system 1000 in FIG. 10 and hand-held controller 1100 in FIG. 11. In some embodiments, sensor device 1200 may be communicatively coupled to virtual-reality system 1000 and/or to a computing device (e.g., a personal computer, a console, etc.)

communicatively coupled to virtual-reality system 1000. As shown in FIG. 12, sensor device 1200 may include a tracking sensor 1202 adjustably positioned on a stand 1204, which is held in an upright position by base 1206. Tracking sensor 1202 may include a camera device that receives images of IR tracking lights (e.g., tracking lights 1108) on virtual-reality system 1000 and/or hand-held controller 1100. The images obtained by tracking sensor 1202 may be utilized to determine location, orientation, and/or movement of hand-held controller 1100 and/or virtual-reality system 1000 (e.g., via constellation tracking). The camera device within tracking sensor 1202 may be covered by a visible-light barrier, such as a cover layer 1208 that covers an aperture of the IR camera device. Cover layer 1208 may function as a visible-light barrier (see, e.g., visible-light barrier 102/502 in FIGS. 1-7) having a non-black coloration that obscures views of internal components and, in some examples, blocks transmission of a substantial portion of visible light, while allowing passage of IR light.

Figure 13:
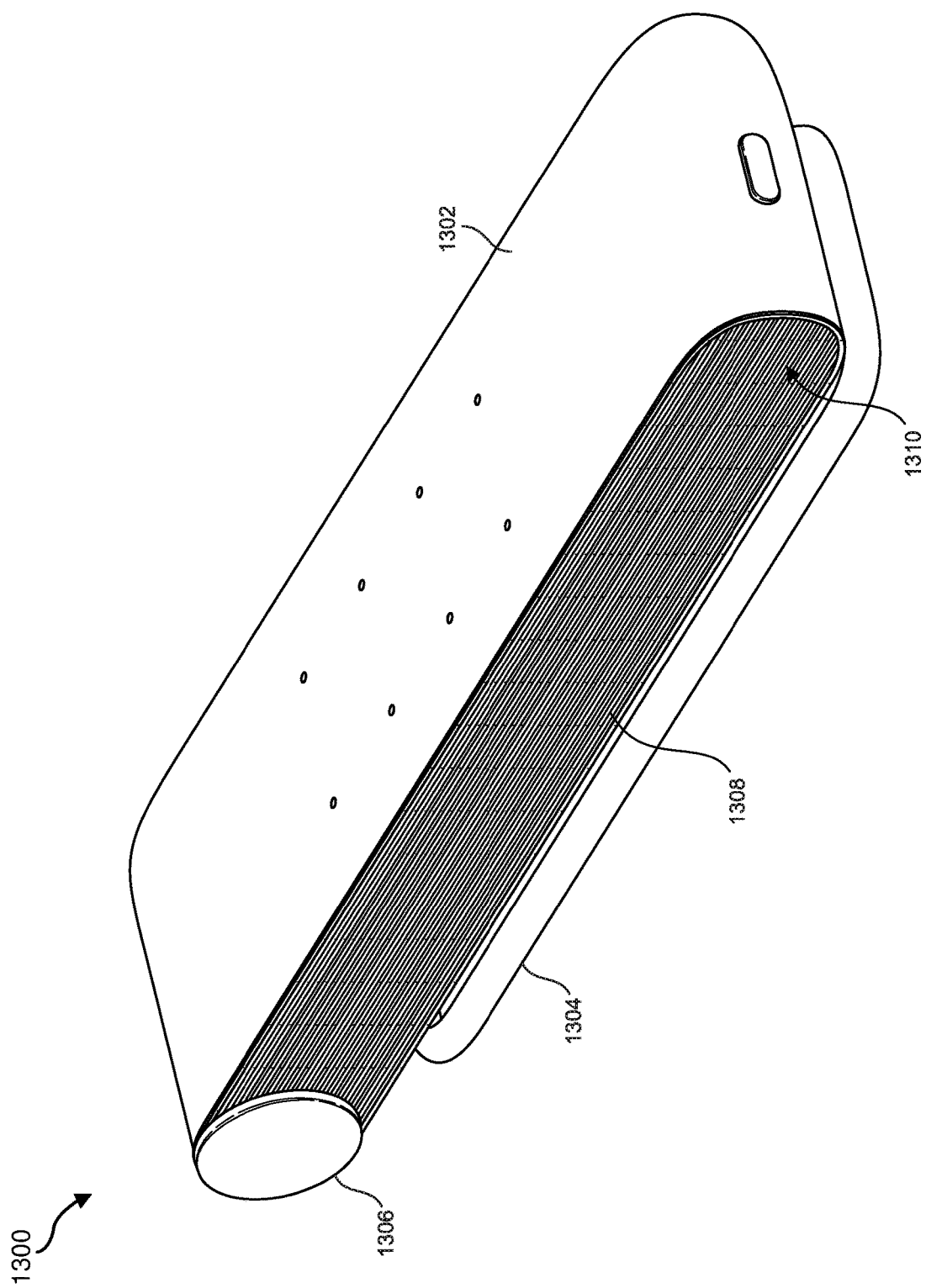
FIG. 13 is an illustration of an exemplary smart camera device that may be used in connection with embodiments of this disclosure.

FIG. 13 illustrates an exemplary smart camera device 1300, which may be mounted to a separate display screen or placed on a surface near the display screen to provide an interactive video experience with other remote users. Smart camera device 1300 may include a housing 1302, a stand 1304, and a camera cover 1306, which may be slidably moved to the side to expose a camera. The smart camera device 1300 may also include a front grille 1308 through which sound from internal loudspeakers is delivered. In some examples, smart camera device 1300 may also include an IR sensor 1310 that receives signals from a hand-held remote control via front grille 1308. In at least one example, the IR sensor may be covered by a visible-light barrier, such as a sensor cover located at or behind front grille 1308. The sensor cover may function as a visible-light barrier(see, e.g., visible-light barrier 102/502 in FIGS. 1-7) having a non-black coloration that obscures views of internal components and, in some examples, blocks transmission of a substantial portion of visible light, while allowing passage of IR light.

Figure 14:
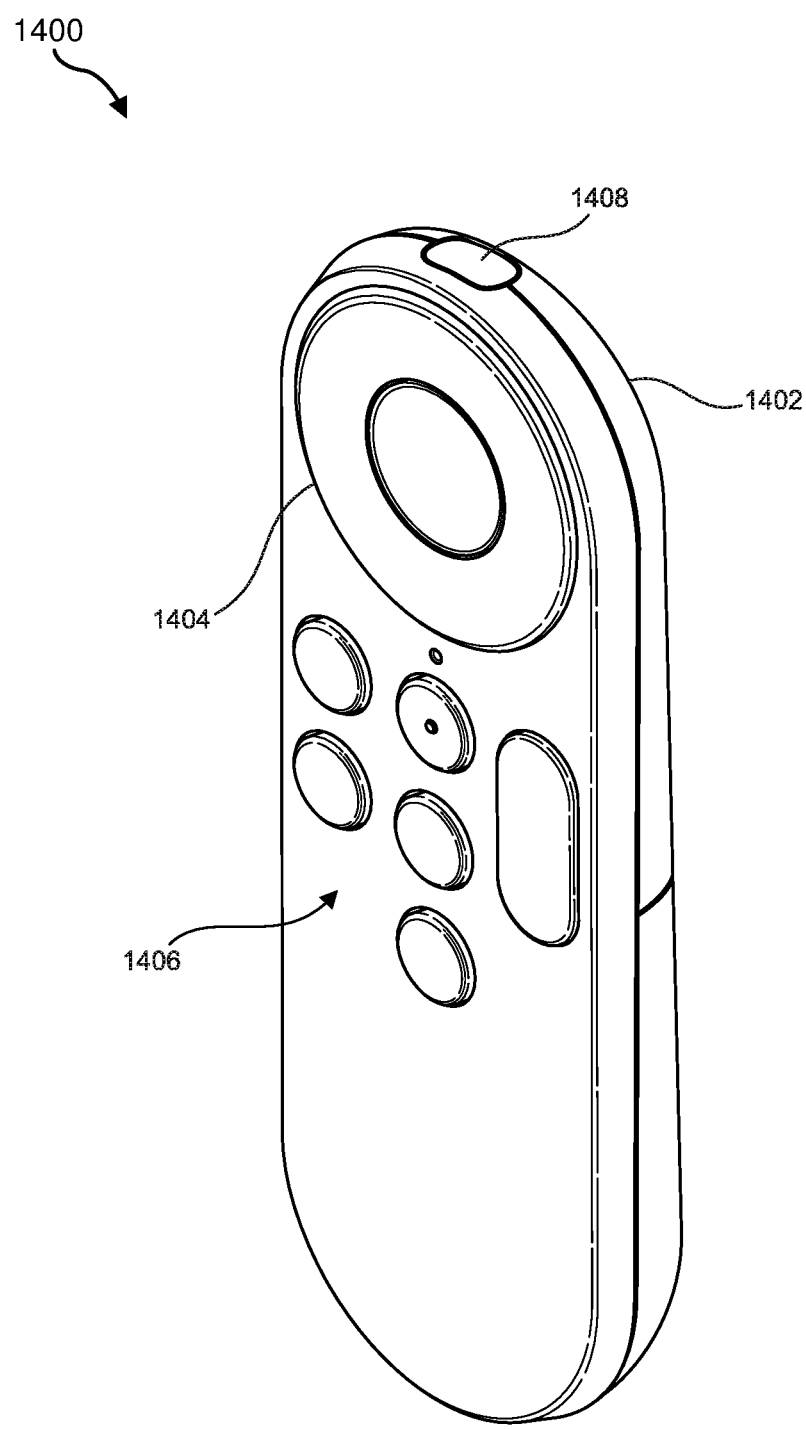
FIG. 14 is an illustration of an exemplary remote control that may be used in connection with embodiments of this disclosure.

FIG. 14 illustrates an exemplary hand-held remote control 1400 for controlling another device, such as smart camera device 1300 in FIG. 13. As shown, remote control 1400 may include an enclosure 1402, a directional pad 1404, and buttons 1406 for controlling actions in a displayed image produced by smart camera device 1300. Remote control 1400 may also include an IR emitter that sends IR light signals that may be received by smart camera device 1300 and/or any other compatible device. The IR emitter may be covered by a transmitter cover 1408, which may function as a visible-light barrier (see, e.g., visible-light barrier 102/502 in FIGS. 1-7) having a non-black coloration that obscures views of internal components while allowing passage of IR light.

EXAMPLE EMBODIMENT

Example 1: A visible-light barrier including a light-scattering layer that preferentially scatters visible light over infrared light, the light-scattering layer including (1) a substantially transparent or translucent material, and (2) at least one of TiO2 or ZnO particles dispersed within the substantially transparent or translucent material at a concentration of from approximately 0.02 wt % to approximately 2 wt %.

Example 2. The visible-light barrier of example 1, wherein the light-scattering layer has an opaque or substantially opaque visual appearance.

Example 3. The visible-light barrier of example 1 or example 2, wherein the light-scattering layer produces a non-black color in a lighted environment.

Example 4. The visible-light barrier of example 3, wherein the non-black color includes a gray color.

Example 5. The visible-light barrier of any one of examples 1-4, wherein the at least one of TiO2 or ZnO particles have an average diameter of less than approximately 400 nm.

Example 6. The visible-light barrier of any one of examples 1-5, wherein the transparent or translucent material includes a polymeric material.

Example 7. The visible-light barrier of example 6, wherein the polymeric material includes a polycarbonate material.

Example 8. The visible-light barrier of any one of examples 1-7, wherein the light-scattering layer further includes a diffusing agent.

Example 9. The visible-light barrier of example 8, wherein the diffusing agent includes mica particles having an average diameter of from approximately 400 nm to approximately 700 nm.

Example 10. The visible-light barrier of example 9, wherein the light-scattering layer includes the mica particles at a concentration of approximately 0.1 wt % or less.

Example 11. The visible-light barrier of any one of examples 1-10, further including an infrared-transmissive layer that substantially blocks transmission of the visible light, wherein the light-scattering layer overlaps the infrared-transmissive layer.

Example 12. The visible-light barrier of any one of examples 1-11, wherein at least approximately 30% of the infrared light incident on the light-scattering layer is transmitted through the light-scattering layer.

Example 13. A device housing including the visible-light barrier of any one of examples 1-12, wherein the light-scattering layer forms an exterior-facing side of the device housing.

Example 14. A visible-light barrier including an infrared-transmissive layer and a light-scattering layer overlapping the infrared-transmissive layer, the light-scattering layer preferentially scattering the visible light over the infrared light, the light-scattering layer including (1) a substantially transparent or translucent material and (2) at least one of TiO2 or ZnO particles dispersed within the substantially transparent or translucent material at a concentration of from approximately 0.02 wt % to approximately 2 wt %.

Example 15. The visible-light barrier of example 14, wherein the infrared-transmissive layer substantially blocks the visible light.

Example 16. The visible-light barrier of example 14 or example 15, wherein the infrared-transmissive layer absorbs approximately 95% or more of the visible light.

Example 17. The visible-light barrier of any one of examples 14-16, wherein at least approximately 30% of the infrared light incident on the light-scattering layer is transmitted through both the light-scattering layer and the infrared-transmissive layer Example 18. The visible-light barrier of any one of examples 14-17, wherein the transparent or translucent material includes a polymer-based coating material.

Example 19. A device including (1) at least one of an infrared light emitter or an infrared light sensor and (2) a device housing including a visible-light barrier disposed between an exterior of the device and the at least one of the infrared light emitter or the infrared light sensor, the visible-light barrier including a light-scattering layer that preferentially scatters visible light over infrared light, the light-scattering layer including (i) a substantially transparent or translucent material and (ii) at least one of TiO2 or ZnO particles dispersed within the substantially transparent or translucent material at a concentration of from approximately 0.02 wt % to approximately 2 wt %.

Example 20. The device of example 19, wherein the device includes at least one of a head-mounted display, a hand-held controller, a remote control, a remote-controlled device, or a tracking sensor device.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A visible-light barrier comprising:
    a light-scattering layer that preferentially scatters visible light over infrared light, the light-scattering layer comprising:
        a solidified substantially transparent or translucent polymeric material; and
        at least one of $TiO_2$ or ZnO particles dispersed within the substantially transparent or translucent polymeric material at a concentration of from approximately 0.02 wt % to approximately 2 wt % that effectively scatters different wavelengths of visible light in substantially similar proportions to give the light-scattering layer a non-black appearance.

2. The visible-light barrier of claim 1, wherein the light-scattering layer has an opaque or substantially opaque visual appearance.

3. The visible-light barrier of claim 1, wherein the light-scattering layer produces the non-black appearance in a lighted environment.

4. The visible-light barrier of claim 3, wherein the non-black appearance comprises a gray color.

5. The visible-light barrier of claim 1, wherein the at least one of $TiO_2$ or ZnO particles have an average diameter of less than approximately 400 nm.

6. The visible-light barrier of claim 1, wherein the polymeric material comprises a polycarbonate material.

7. The visible-light barrier of claim 1, wherein the light-scattering layer further comprises a diffusing agent.

8. The visible-light barrier of claim 7, wherein the diffusing agent comprises mica particles having an average diameter of from approximately 400 nm to approximately 700 nm.

9. The visible-light barrier of claim 8, wherein the light-scattering layer comprises the mica particles at a concentration of approximately 0.1 wt % or less.

10. The visible-light barrier of claim 1, further comprising an infrared-transmissive layer that substantially blocks transmission of the visible light, wherein the light-scattering layer overlaps the infrared-transmissive layer.

11. The visible-light barrier of claim 1, wherein at least approximately 30% of the infrared light incident on the light-scattering layer is transmitted through the light-scattering layer.

12. A device housing comprising the visible-light barrier of claim 1, wherein the light-scattering layer forms an exterior-facing side of the device housing.

13. A visible-light barrier comprising:
   an infrared-transmissive layer; and
   a light-scattering layer overlapping the infrared-transmissive layer, the light-scattering layer preferentially scattering the visible light over the infrared light, the light-scattering layer comprising:
      a solidified substantially transparent or translucent polymeric material; and
      at least one of $TiO_2$ or ZnO particles dispersed within the substantially transparent or translucent polymeric material at a concentration of from approximately 0.02 wt % to approximately 2 wt % that effectively scatters different wavelengths of visible light in substantially similar proportions to give the light-scattering layer a non-black appearance.

14. The visible-light barrier of claim 13, wherein the infrared-transmissive layer substantially blocks the visible light.

15. The visible-light barrier of claim 13, wherein the infrared-transmissive layer absorbs approximately 95% or more of the visible light.

16. The visible-light barrier of claim 13, wherein at least approximately 30% of the infrared light incident on the light-scattering layer is transmitted through both the light-scattering layer and the infrared-transmissive layer.

17. The visible-light barrier of claim 13, wherein the polymeric material comprises a polymer-based coating material.

18. A device comprising:
   at least one of an infrared light emitter or an infrared light sensor; and
   a device housing comprising a visible-light barrier disposed between an exterior of the device and the at least one of the infrared light emitter or the infrared light sensor, the visible-light barrier comprising a light-scattering layer that preferentially scatters visible light over infrared light, the light-scattering layer comprising:
      a solidified substantially transparent or translucent polymeric material; and
      at least one of $TiO_2$ or ZnO particles dispersed within the substantially transparent or translucent polymeric material at a concentration of from approximately 0.02 wt % to approximately 2 wt % that effectively scatters different wavelengths of visible light in substantially similar proportions to give the light-scattering layer a non-black appearance.

19. The device of claim 18, wherein the device comprises at least one of a head-mounted display, a hand-held controller, a remote control, a remote-controlled device, or a tracking sensor device.

* * * * *